May 3, 1960  H. H. GORRIE  2,935,670
INDICATING AND/OR CONTROL APPARATUS
Filed April 17, 1957  6 Sheets-Sheet 1

INVENTOR.
HARVARD H. GORRIE
BY
ATTORNEY

FIG. 4

INVENTOR.
HARVARD H. GORRIE

May 3, 1960 H. H. GORRIE 2,935,670
INDICATING AND/OR CONTROL APPARATUS
Filed April 17, 1957 6 Sheets-Sheet 5

INVENTOR.
HARVARD H. GORRIE
BY
ATTORNEY

May 3, 1960  H. H. GORRIE  2,935,670
INDICATING AND/OR CONTROL APPARATUS
Filed April 17, 1957  6 Sheets-Sheet 6

FIG. 9

INVENTOR.
HARVARD H. GORRIE
BY
ATTORNEY

United States Patent Office 2,935,670
Patented May 3, 1960

2,935,670

INDICATING AND/OR CONTROL APPARATUS

Harvard H. Gorrie, Cleveland Heights, Ohio, assignor to Bailey Meter Company, a corporation of Delaware Application April 17, 1957, Serial No. 653,427

16 Claims. (Cl. 318—28)

The present invention relates to the manifestation and control of variables with respect to predetermined standards for the variables.

Industrial processes are generally quite complex. These processes may be supplied a number of materials which are treated and combined to form one, or a number, of products. The manifestation and control of the variables associated with the supplies and products of processes are, of course, necessary for control of the quantity and quality of the product.

Temperature, pressure and flow are basic variables of the state of materials. Additionally, other conditions determine the state of the supplies, products and intermediate materials within the process. The determination and control of the interrelation between the variables is sought with the present invention.

Whether a variable may be termed independent or dependent depends upon its relationship to the other variables of the process. The terms are relative. With respect to a particular process, one of its variables may be termed independent if it changes under influences external of the process. Variables internal of the process, which change in accordance with alterations of the values of the independent variables, are termed dependent variables.

Considering normal operation of the process, all variables have their individual ranges of variation, and a standard value, for normal operation, which will fall within the range of variation. Also, the dependent variables may be looked upon as having relationships to the independent variables affecting the dependent variable which may be expressed as functions of the dependent variables. It may be said that a dependent variable of a process has a functional relation to its independent variable.

In disclosing the present invention, the process in which steam is generated for the production of electric power has been selected to illustrate a process having dependent and independent variables. Considering the process as extending from a furnace producing products of combustion of a fuel for the heating of a boiler, the process will be considered as including the function of the turbine receiving the steam and electric generator being powered by the turbine. Thus we have the generator output in the form of electrical power as a dependent variable with respect to which the supplies of the fuel, air, water, etc. to the furnace and boiler are independent variables. The rate at which power from the generator is required may be looked upon as "demand" upon the system and for every value of power required there are well-defined functional relationships with the independent variables of the system.

The present invention is embodied in apparatus responsive to a dependent variable to produce a function of the dependent variable, in the form of a signal, which represents a standard value for an independent variable. A plurality of signals are produced individually by characterizing means which are the functional links between the single dependent variable and one or more independent variables. Mechanism in which the invention is embodied becomes the generator of a function of the dependent variable to which it is responsive. Each of the functional outputs of the generator may then be compared with actual measurements of the independent variable to indicate deviations between their values and establish control actions for the dependent variables in accordance with the deviations.

In generalization, the function generator is characterized by a positionable member. Mechanism for positioning the member may be of either electronic or fluid pressure in nature. The ultimate result is to position the member over a range representative of variations of the dependent variable. Electrical or fluid pressure output devices are actuated by the positionable member to establish the signals having functional relationships with the dependent variable. These characterizing devices may include cams or non-linear resistance elements.

If the positionable member of a function generator is controlled from a first variable, the characterizing device may be the initial source of a signal which is a function of the first variable or it may, itself, receive energization from the second variable signal which originates from another function generator. The resulting output of the first function generator may be a mathematical combination of the first and second variables. Obviously, a series of function generators may mathematically combine any number of variables introducing a final output.

A broad object of the invention is the manifestation of the deviation of variables from predetermined standard values.

Another object is a control of the deviation of variables from their predetermined standards.

Another object of the invention is to establish the position of a member, as representative of the dependent variable in order to actuate characterizing mechanisms in manifesting functional values of the dependent variable as predetermined standards for the independent variables affecting the dependent variable.

Another object of the invention is to energize the characterizing mechanism of a member positioned by a dependent variable with an independent variable in order to produce an output representative of a mathematical relation between the variables.

Figure 1:
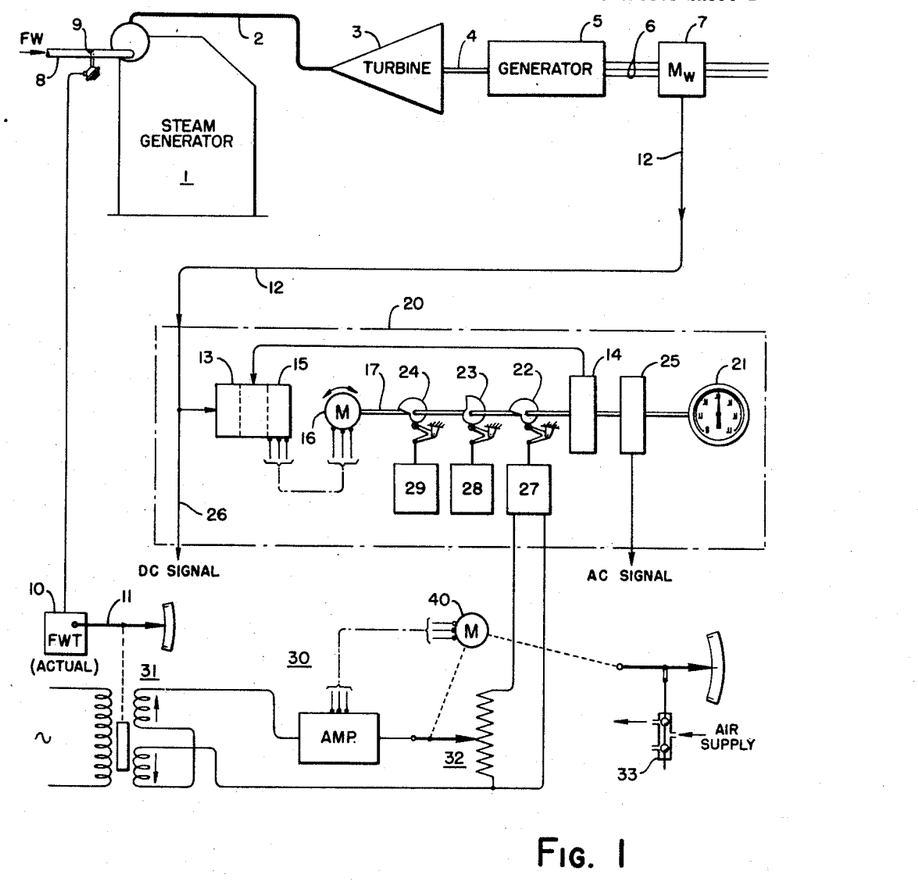
Fig. 1 is a diagrammatic representation of a system illustrating a function generator as a component of a deviation indicator.

General system of Fig. 1

Referring to Fig. 1, a system is represented, including a function generator, associated with an electrical power generating unit as an illustration of an industrial process which utilizes the present invention. A steam generator 1 is illustrated as a source of steam which flows through conduit 2 to turbine 3 for the generation of motive power delivered by shaft 4 to electrical generator 5. The electrical energy produced by generator 5 is applied to lines 6. This electrical energy, expressed in terms of megawatts, is measured by a thermal converter 7.

The megawatts produced by generator 5, and measured by converter 7, is a variable dependent upon preceding variables of the process at any specified demand for megawatts. An illustration of a single variable, which may be termed independent, is the temperature of feedwater flowing through conduit to the boiler of furnace 1, sensed by element 9. Element 9 may be a resistance thermometer or thermocouple, as part of a measuring system including meter structure 10 which converts the measurement of temperature into a mechanical movement of member 11.

Returning to consider the dependent variable, megawatts, measured by converter 7, this may take the conventional form illustrated in the patent Williams, Jr., et al. 2,124,725. The heat generated in converter 7 by the output of generator 5 is sensed by thermocouples which produce the D.-C. voltage representative of the power. Line 12 illustrates the connection between the converter 7 and one of many possible electric circuits located at 13.

The electric circuit located at 13 may be generally referred to as a balanceable electric network, unbalanced by the output of converter 7 and rebalanced by the output of electric device 14. Specifically, the unbalance of network 13 is amplified and applied to a motor drive circuit 15 which controls the direction of rotation of motor 16. Motor 16 positions shaft 17 on which is mounted the rebalancing electric device 14.

The positioning of shaft 17 establishes the output of function generator 20, this output is compared with the temperature sensed by 9. The deviation between them is manifested and utilized.

Function generator 20

The balanceable system characterized by network 13, motor 16 and shaft 17 becomes the focal point of an analysis of the function generator structure designated 20. Function generator 20 is so termed in view of the fact that it receives an analog force, exemplified by the D.-C. voltage of line 12, and establishes a force having a predetermined functional relation to the analog force.

Function generator 20 may take several variations of form in carrying out the objects of the present invention. All of the forms are characterized by the establishment of a range of positions for a structural member, corresponding to the range of the analog force to be characterized. In Fig. 1, shaft 17 is representative of the positioned structural member and is rotated by motor 16 through a range of degrees corresponding to an expected range of variation of the power in lines 6, produced by generator 5. The range of positions of structural member-shaft 17 is indicated on gage 21. Shaft 17 is elongated as necessary to accommodate output devices which are electric and/or fluid pressure in nature.

As represented in Fig. 1, functional generator 20 responds to the output of generator 5 to position cams 22, 23, and 24, as well as rebalancing electric device 14 and retransmitting electric device 25. Thus, the device offers the establishment of individual functions by the profiles of cams 22, 23 and 24, the retransmission of electric device 25, the rebalancing electric signal of device 14 and the directly observed indications of 21. Also, the input D.-C. voltage signal of line 12 may also be passed on to other devices and systems by line 26. As retransmitting electric device 25 may form an element of an A.-C. voltage electric network, the signal generator may be a source for both types of signals, individually related to the output of electric generator 5.

Deviation network 30

Figure 2:
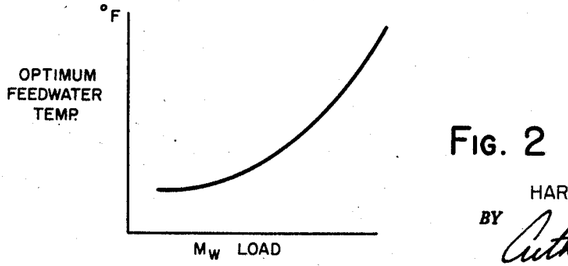
Fig. 2 is a plot of the functional relationship between the independent and dependent variables of Fig. 1.

Deviation network 30 responds to the analog force established by device 9 and the functionalized force of converter 7. Any deviation between the two establishes a manifestation by network 30. Network 30 compares the voltage established by MCT 31 and the voltage drop across potentiometer 32. In balancing these voltages, network 30 establishes an output force representative of deviation between the two analog forces compared in network 30. The specific function of network 30 is the control of motor 40 to establish a motion, or position, which can be observed or utilized to establish a control fluid pressure, or some other transmitting medium of the force or position. Pilot valve 33 is representative of control devices which can respond to motor 40 to establish control fluid pressures. Referring to Fig. 2, there is disclosed a plot representative of the relation between the output of generator 5 and the optimum values of feedwater temperatures. This comparison plot is empirically determined to be the relation between the variables when the process is functioning normally, with the greatest possible efficiency, or some other predetermined condition. Once it is established what overall conditions of process operation dictate the plot of the curve of Fig. 2, this condition becomes the "standard" as far as the subsequent variations of the feedwater temperature, as the independent variable, are concerned.

It may now be appreciated that for every value of output of generator 5 there is a predetermined standard feedwater temperature. With the standard relation between feedwater temperature and generator output established, the profile of cam 22 may be shaped to cause movable core transformer 31 to give an output in accordance with the standard. Continuous operation of the system then becomes one of comparing the standard values of feedwater temperature, for every value of generator 5 output, against values of feedwater temperatures as actually measured. Subsequent operation of the process, under varying conditions, will produce the manifestation of deviation of such independent variable from the standard established by the shaping of its cam profile; the cam profile representing the functional relationship between the dependent variable of the process output and the independent variable.

Figure 3:
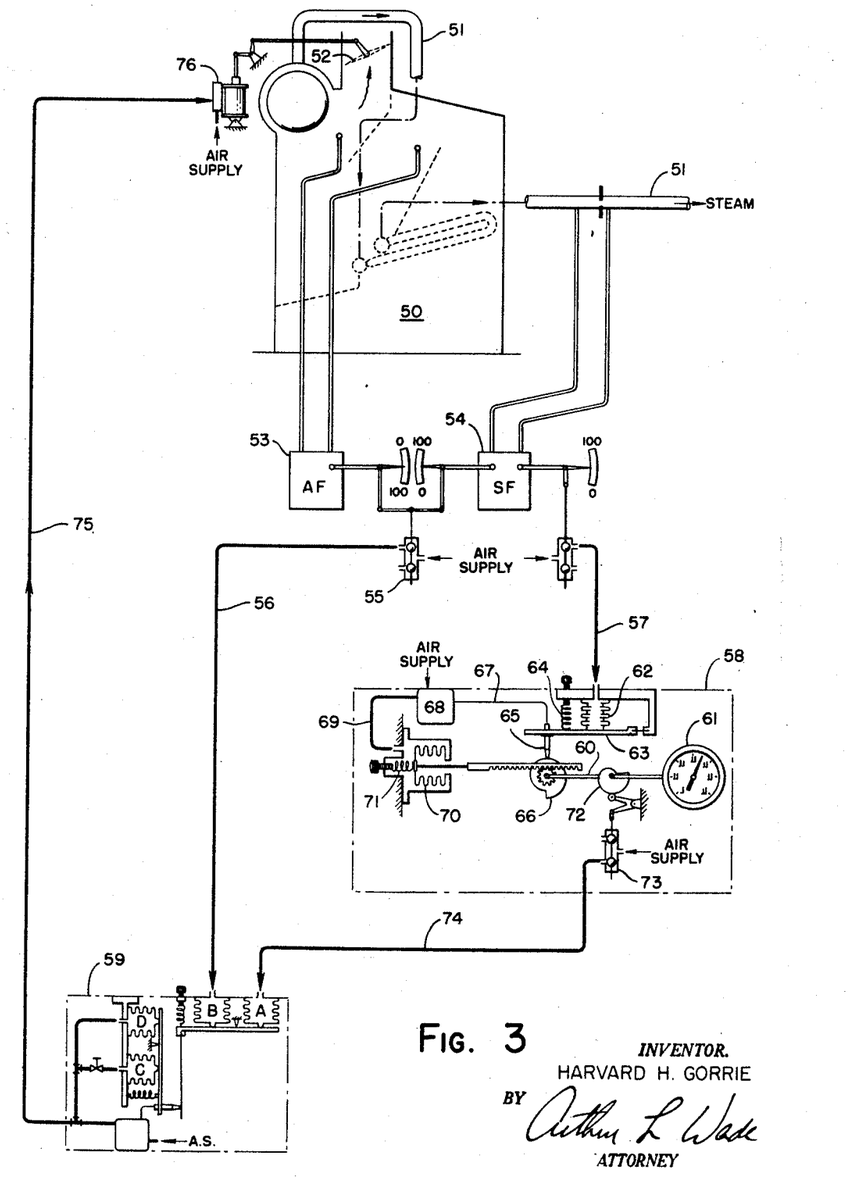
Fig. 3 is a diagrammatic representation of a control system for the relation between two variables by another variable.

General system of Fig. 3

Referring to Fig. 3 another use of the function generator is illustrated, along with a second form of the generator itself, as to its mechanism responsive to the input analog force and functional output. The process of steam generation is utilized as a general example of a process. Furnace-boiler 50 is illustrated in production of steam to pipe 51 by the burning of fuel and air, the control of air being under the regulation of damper 52.

Again it is to be understood that there are many variables of this process which have not been illustrated. Only the relation of flow of air to the process, as indicative of the heat released in the process, and the flow of steam from the process, as indicative of the heat absorbed from the process, is used in illustration. It is well understood that a predetermined relationship between these two variables must be maintained for efficient operation of the combustion of the process. A conventional meter 53 is indicated as responsive to the air flowing to the process. A conventional meter 54 is disclosed as responsive to the steam flowing from the process. These meters mechanically actuate differential linkage, and their calibrations are established so that the linkage will actuate a fluid pressure pilot valve 55 to establish an output fluid pressure in 56. The value of fluid pressure in 56 remains fixed at a "standard" value if the steam flow-air flow relation of meters 53 and 54 is at the desired value. Deviations from the desired relation will cause deviation in the value of fluid pressure in pipe 56 which will be applied to the control of damper 52 to return the relation to the predetermined standard.

Like many industrial processes, that of steam generation is complex. The variations of the conditions under which the process is operated are infinite. The relatively simple differential linkage between meters 53 and 54 can not be given sufficient flexibility to take into account the effect of independent variables upon the steam flow-air flow relation as a dependent variable. There are certain values of independent variable at which it is desirable to originally calibrate the steam flow-air flow relation to attain the most efficient combustion. The relatively simple differential linkage disclosed is calibrated to hold the relation along a logical extension of a number of empirically ascertained points. The function generator can be utilized to alter the relation, over selected ranges of the steam flow-air flow relation, to give a more sophisticated, desirable, control of the relation.

Taking the flow of steam, itself, as illustrative of an independent variable of the process, it to be understood that at certain low ratings of steam flow, a slight alteration of the original calibration of the steam flow-air flow relation may be desirable. There is no problem in establishing a fluid pressure in pipe 57, from a pilot valve actuated by steam flow meter 54. The force of this fluid pressure in 57 is applied, by function generator 58, to balance the force of fluid pressure of pipe 56 in a comparing relay 59. Deviations between the two forces will result in a variation of the output of relay 59 in control of damper 52.

Function generator 58

Function generator 58 is similar to function generator 20 in having a shaft 60 with a range of rotation which is indicated on a dial 61.

In order to position shaft 60, by the fluid pressure force of line 57, a fluid couple is used to sense movement of a member to which the force of the fluid pressure of pipe 57 is directly applied in order to develop a force with sufficient power to rotate shaft 60. Specifically, the fluid pressure of pipe 57 is applied to a bellows 62 in order to pivot beam 63 against the force of spring 64. The bellows and spring can be sized to gear a desired range of movement of lever 63 to the range of fluid pressures in pipe 57. Attached to lever 63 is one half of a fluid pressure couple. Nozzle 65 is, specifically, one-half of the fluid pressure couple, the other half being the profile of cam 66, fixed to shaft 60.

The cooperation between the profile of cam 66 and nozzle 65 is well understood in the development of a nozzle pressure in pipe 67 which controls the output of the fluid pressure amplifier 68 in pipe 69. The fluid pressure in pipe 69 is applied to bellows 70, against the force of spring 71 with sufficient power to position shaft 60. The overall operation becomes one of having the force of fluid pressure 57 adjust the fluid pressure couple 65—66 to establish corresponding positions in the rotation of shaft 60, indicated on dial 61. The profile of cam 66 may be suitably shaped to give linearity to the rotation of shaft 60 in correspondence to the variations of the fluid pressure in pipe 57.

Comparative relay 59

Relay 59 receives the fluid pressures in pipe 56 and pipe 74 in comparative relationship. Specifically, the pressures are received into similar fluid pressure bellows, opposed across the fulcrum of a beam. A spring is shown in biasing the forces on the beam in order that they do not have to be equal. However, with a spring of constant rate, the forces obviously must be proportional as they vary over their ranges or the beam will be moved. The mechanism of the relay may take the form of that disclosed in the patent, Gorrie 2,776,669. The output of the relay is established in pipe 75 and it may be given proportional, rate and reset characteristics with settings of its mechanism.

Overall operation of Fig. 3

The pressures of pipe 75 are applied to a power mechanism 76 which positions a damper 52. Should the steam flow-air flow relation develop fluid pressures in pipe 56 which do not proportionally correspond with the fluid pressures developed in pipe 74, by function generator 58, damper 52 will be adjusted to change the air flow until the relation between the air flow detected by meter 53 and the steam flow detected by meter 54 develops a pressure in pipe 56 which does correspond to the pressure in pipe 74.

It is now apparent that function generator 58 provides a means for biasing the precalibrated action of air flow meter 53 and steam flow meter 54 in positioning the differential linkage actuating pilot valve 55. If at low ratings the steam flow, it is observed that less than the theoretical amount of air flow calibrated into the relation meters is required for efficient combustion, the cam 72 of function generator 58 is shaped to characterize the output fluid pressures of pipe 74, with respect to those of pipe 57, and unbalance relay 59 in the direction to close damper 52 and required amount to decrease the air flow. Generalizing, it can be seen that the dependent variable, steam flow-air flow relation, can be altered from a first predetermined value to a predetermined variation dictated by an independent varibale properly manipulating the forces established by the independent variable.

Calculating system of function generators

Figure 4:
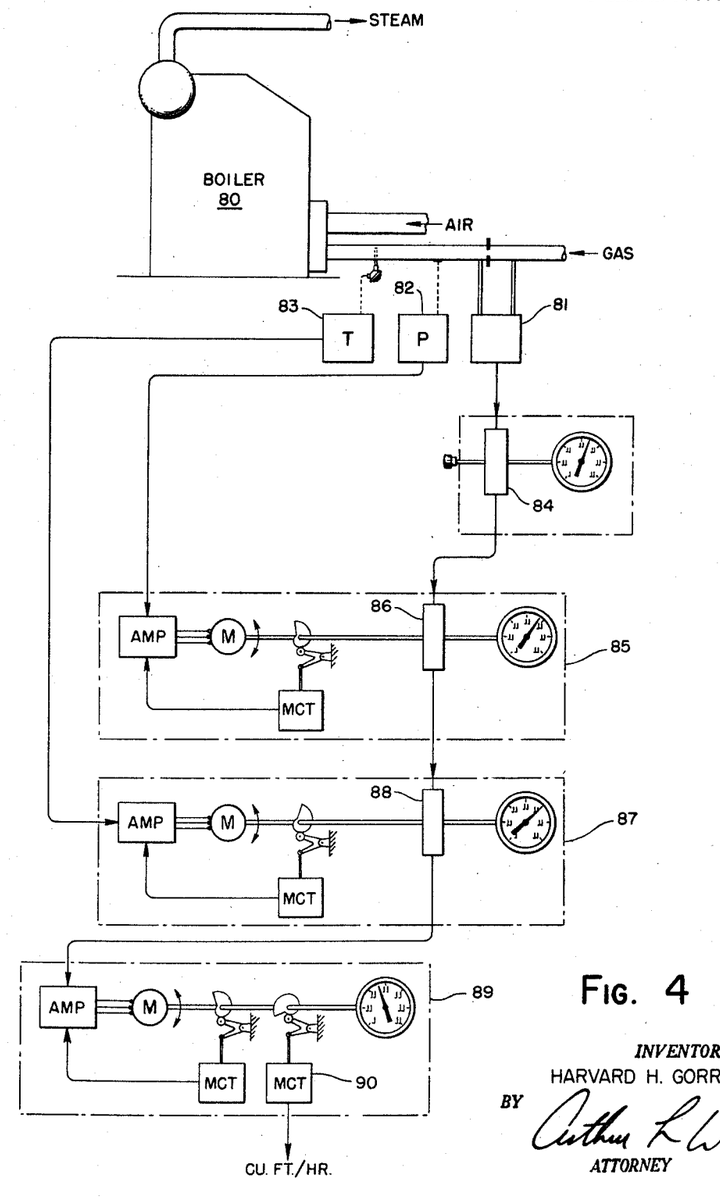
Fig. 4 is a diagrammatic representation of a system for mathematically combining dependent and independent variables to give an accurate manifestation of the dependent variable.

The utility of the function generator is further demonstrated in Fig. 4. The disclosure further demonstrates how the function generator of the present invention can be utilized to mathematically manipulate the relation between a multiplicity of variables.

The process of steam generation is again relied upon to illustrate variables to which the invention responds. A furnace-boiler 80 is shown, supplied fuel and air and producing steam. Fundamental conditions of the state of the gaseous fuel are measured and applied to apparatus embodying the invention. Specifically, flow is measured by device 81, pressure is measured by device 82 and temperature is measured by device 83. Another variable of the gaseous fuel is specific gravity, not illustrated in specific measurement. It is assumed that the specific gravity is ascertained by other means and corrections for it introduced manually into the measuring system.

The end results sought by the measurements taken by the system of Fig. 4 is the manifestation of the correct flow rate for the gaseous fuel burned in the furnace-boiler 80. Meter 81 responds to the differential across a restriction in the flow path of the gaseous fuel, and it is well understood that the response of such a device is accurate only at conditions of temperature, pressure and specific gravity for which the restriction has been designed. Therefore, as these variables depart from "design" value, the manifestation of meter 81 must be corrected for the departures to obtain the correct manifestation of flow rate.

The first correction to be given the output of meter 81 is that for specific gravity. With meter 81 positioning a movable core transformer to establish an output voltage, this output voltage may be used to energize potentiometer 84. The setting of potentiometer 84 is accomplished manually, in accordance with the specific gravity of the fuel. The result is to establish a portion of the movable core transformer output of meter 81 as the input to function generator 85.

Function generator 85 is similar to function generator 20 of Fig. 1. A shaft is provided which is positioned in accordance with the values of a variable. The variable, in this disclosure, is the output of meter 82, responsive to pressure of the fuel gas. Slidewire-potentiometer 86 is positioned by the shaft of the function generator 85 and, energized by the output of potentiometer 84. A multiplication of the flow, differentials specific gravity and pressure is accomplished, the result being established as an output of function generator 85.

Function generator 87 has a slidewire 88 energized by the output of function generator 85. Function generator 87 has the shaft of its slidewire 88 positioned from the temperature of the fuel gas, sensed by meter 83. The output of function generator 87 is the result of multiplying the flow differential by the specific gravity, by the temperature and by the pressure of the fuel gas.

Function generator 89 then receives the properly corrected flow differential manifestation of meter 81 and positions its shaft with this variable. It is readily understood that the output transmitter of function generator 89 may be actuated by a cam on its shaft to extract the square root of the head differentials to produce a final output which is proportional to the flow of the fuel gas, corrected for the existing value of specific gravity, pressure and temperature. Specifically, movable core transformer 90 is positioned as the output transmitter establishing the final output signal of corrected flow.

*Physical arrangement of structure*

Figure 5:
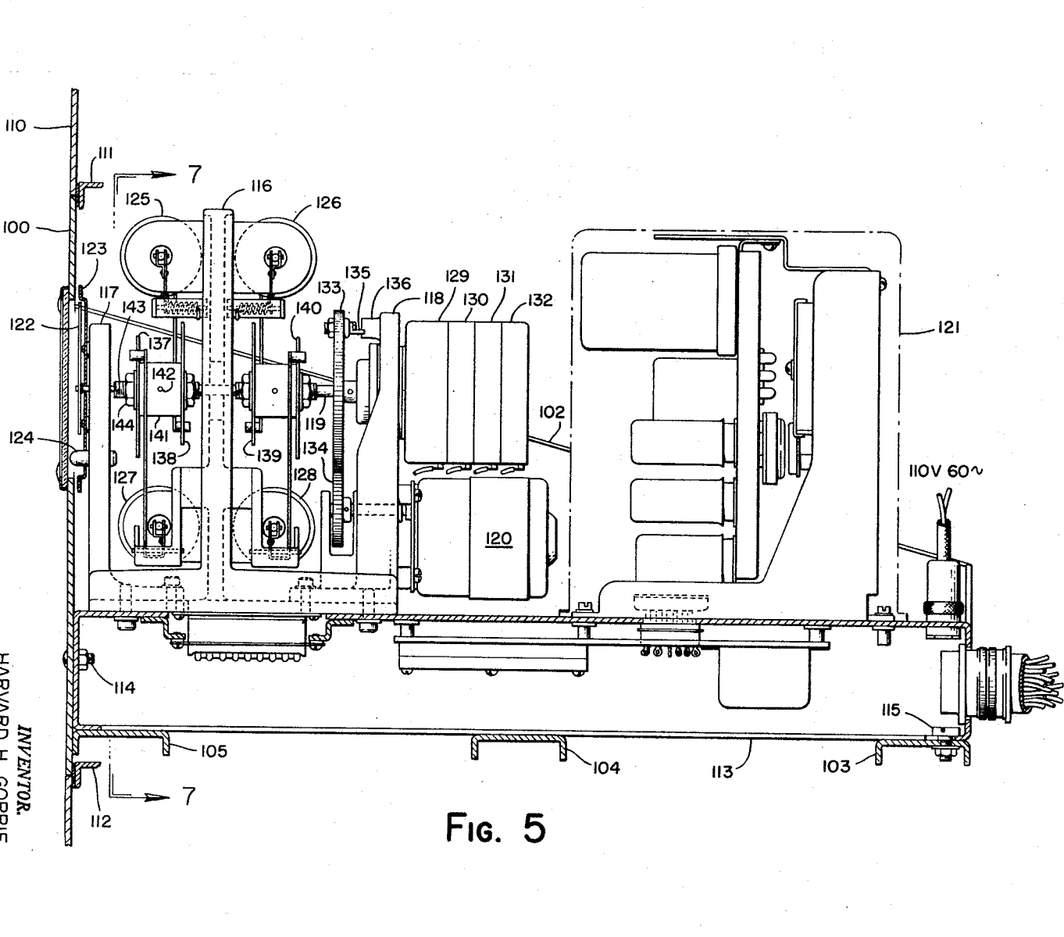
Fig. 5 is a cross-sectional elevation showing the components of a function generator of Fig. 1, to somewhat larger scale.

Referring to Fig. 5, there is shown in a side elevation, the components of a function generator unit of the type disclosed in Fig. 1. The illustration is suitably sectioned to show how the various structural elements are carried on their unitary chassis and are actuated through the centrally located shaft.

Figure 6:
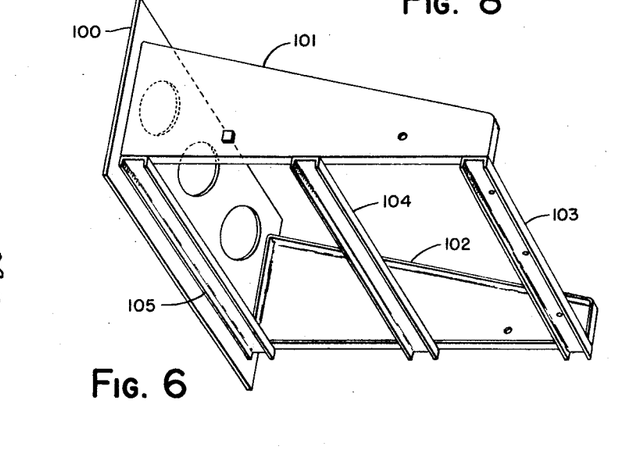
Fig. 6 is a perspective showing of the drawer structure for supporting the function generator of Fig. 5.

The support for the unitary chassis of the function generator is a drawer which may be proportioned to carry a plurality of the generator units. Fig. 6 is a perspective view of the preferred form of the drawer-framework support for the units.

The essential elements of the drawer of Fig. 6 are a front plate 100 to which is welded two side gusset plates 101 and 102. The side gusset plates give lateral definition to the drawer structure and support for three bottom channel members 103, 104 and 105. The channel members, welded to the gusset plates become the floor, or bottom, of the drawer and specifically support the function generator unit in the drawer. The front plate 100 has a suitable number of apertures for viewing the necessary manifestations of the generator functions. The apertures may have individual transparent covers through which viewing from external of the drawer may be accomplished.

The entire drawer-support is carried, as a unit, behind a panel structure from which it may be withdrawn on tracks. These tracks permit manually controlled sliding withdrawal of the drawer units from behind its supporting panel.

Referring specifically to Fig. 5, the essential elements of the drawer of Fig. 6 are depicted. Additionally, the supporting panel 110 is indicated with channel strips 111 and 112 limiting the travel of the drawer when it is inserted in panel 110. This limiting means establishes alignment of the panel and front plate surfaces.

The physical confirmation of the function generator of Fig. 5 is given definition by a chassis 113. Chassis 113 is constructed of a single plate. This plate is suitably punched, drilled, bent and welded to form a shell upon which the components of the generator are mounted on and with which the generator is mounted on and carried in the drawer of Fig. 6. Specifically chassis plate 113 is attached by bolts 114 and 115 to the front plate 100 and channel 103 of the drawer. On this firm foundation of chassis, slideable drawer and supporting panel are mounted the components of the function generator.

An analysis of the disclosure of Fig. 5 will reveal that three mounting brackets are fixed to the chassis plate 113 for support of the mechanically dynamic components of the generator. Specifically, a coil support bracket 116 is bolted directly to chassis plate 113 and front bearing support bracket 117 is bolted directly to bracket 116. Motor support bracket 118 is correspondingly bolted to bracket 116.

Attention is specially directed to shaft 119 which is passed through an opening in bracket 116 in order that it may be rotated by motor 120, mounted on bracket 118. Motor 120 is controlled by signals applied to the generator as amplified by an electrical circuit in housing 121, bolted directly to chassis plate 113.

The positions to which shaft 119 are rotated are here indicated by pointer 122 mounted on the end of the shaft and moved over the surface of dial 123. Dial 123 is mounted on bracket 117 through which shaft 119 is journaled in a bearing. The dial 123 is given a dish shape in order that its rim may carry viewed indications cooperating with the pointer 122 to eliminate parallax. Also carried on bracket 117 is a small signal light 124. Light 124 extends through dial 123 in order to be visually observed and is arranged in circuit to manifest malfunction when the servo system of the generator is unbalanced.

Shaft 119 has the primary functions of actuating electrical output devices, as previously described in Figs. 1 and 4. These electric output devices are illustrated as movable core transformers 125, 126, 127, 128 and potentiometers 129, 130, 131, 132. The movable elements of the potentiometers are mounted directly on shaft 119 which is journaled in bracket 118. The MCT's (movable core transformers) are actuated through cams directly carried by shaft 119.

Motor 120 is mounted on bracket 118 and rotates shaft 119 through gears 133 and 134. Limiting stop structure 135 is generally indicated as mounted on gear 133 and contacting an abutment 136 on bracket 118.

MCT's 125—128 have their cores moved through cams 137, 138, 139, 140. The profiles of these cams are shaped in accordance with the functions outlined supra. The cams are mounted on shaft 119. The basic element of the mounting structure for the cams is represented by support block 141. Block 141 is pinned to shaft 119 with pin 142. Each vertical surface of block 141 constitutes a shoulder against which a cam is held. A central, threaded, protuberance 143 extends from one shoulder face, and cam 137 is captured between the shoulder face of block 141 and nut 144.

Figure 7:
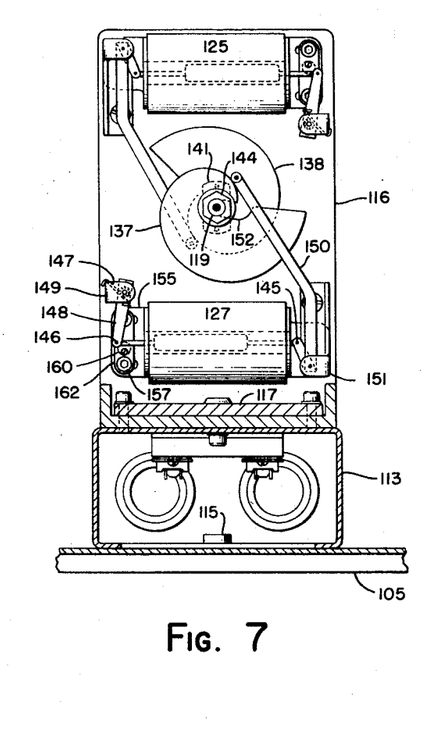
Fig. 7 is a sectional elevation of the function generator taken along line 7—7, in the direction of the arrows.
Figure 8:
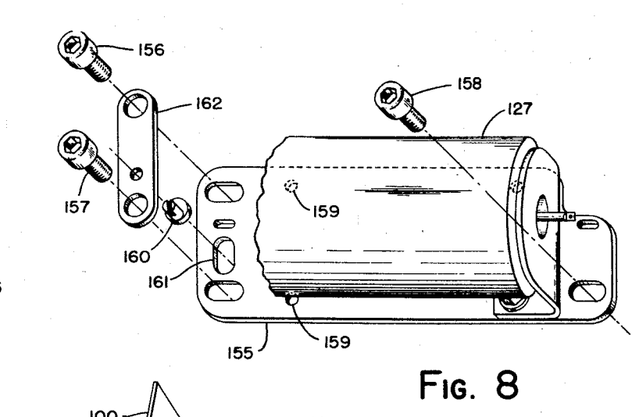
Fig. 8 is an isometric illustration of the movable core transformer showing in an exploded manner the method of support of the transformer, and adjustability of the movable stator of the transformer.

Referring to Fig. 7, further details of the relation between shaft 119, chassis 113, cams 137, 138 and MCT's 125 and 127 is shown. Fig. 7 is a sectional elevation taken along line 7—7 of Fig. 5. The actuating structure between the MCT and its cam is clearly disclosed. Fig. 8 is to be considered with Fig. 7 in showing the support and position adjusting structure for the stator of the MCT.

In Fig. 7 the face of coil support bracket 116 dominates the view as it is mounted on chassis 113. MCT's 125 and 127 are mounted on bracket 116. Specifically, in illustration, the stator of MCT 127 is positionally fixed to the bracket 116 and its core is suspended from pivots 145, 146.

The core of MCT 127 is urged to the left, in Fig. 7, by spring 147 acting through drive arm 148, containing pivot 146. The other pivoted end of arm 148 is fixed with respect to bracket 116 by drive arm shaft support 149 bolted to bracket 116.

On the right end of the core of MCT 127, pivot 145 is carried by cam follower arm 150 which, itself, is pivoted from lower follower support 151, bolted to bracket 116. With the profile of cam 137 positioning arm 150, the core of MCT 127 is positioned against the force of spring 147. This operation is obviously duplicated between the other cams and MCT's.

The cams are slotted as shown at 152 on cam 137. These slots facilitate removal and replacement of any one cam without disturbing the remaining cams.

Referring to Fig. 8, the mounting structure for the stator of the MCT's is illustrated as dominated by plate 155. This Fig. 8 is an exploded elevation of the plate 155 and the structure with which it is mounted on bracket 116.

Specifically, cap screws 156, 157, 158 bolt plate 155 to bracket 116, MCT 127 is fixed to plate 155 with capturing end brackets which are bolted through holes of which 159 is representative. In initial, or calibrating, adjustment of the positioned relation between the core and stator of MCT 127, it is desired to be able to shift the stator horizontally. This shifting can be brought about conveniently through eccentric 160 which is captured in elongated hole 161 by retaining plate 162. It is only necessary to loosen cap screws 156, 157 and 158 in order to manipulate eccentric 160. The holes for the cap screws are horizontally slotted to permit this adjustment and guide pins are provided for precise vertical alignment over the range of horizontal adjustment.

Figure 9:
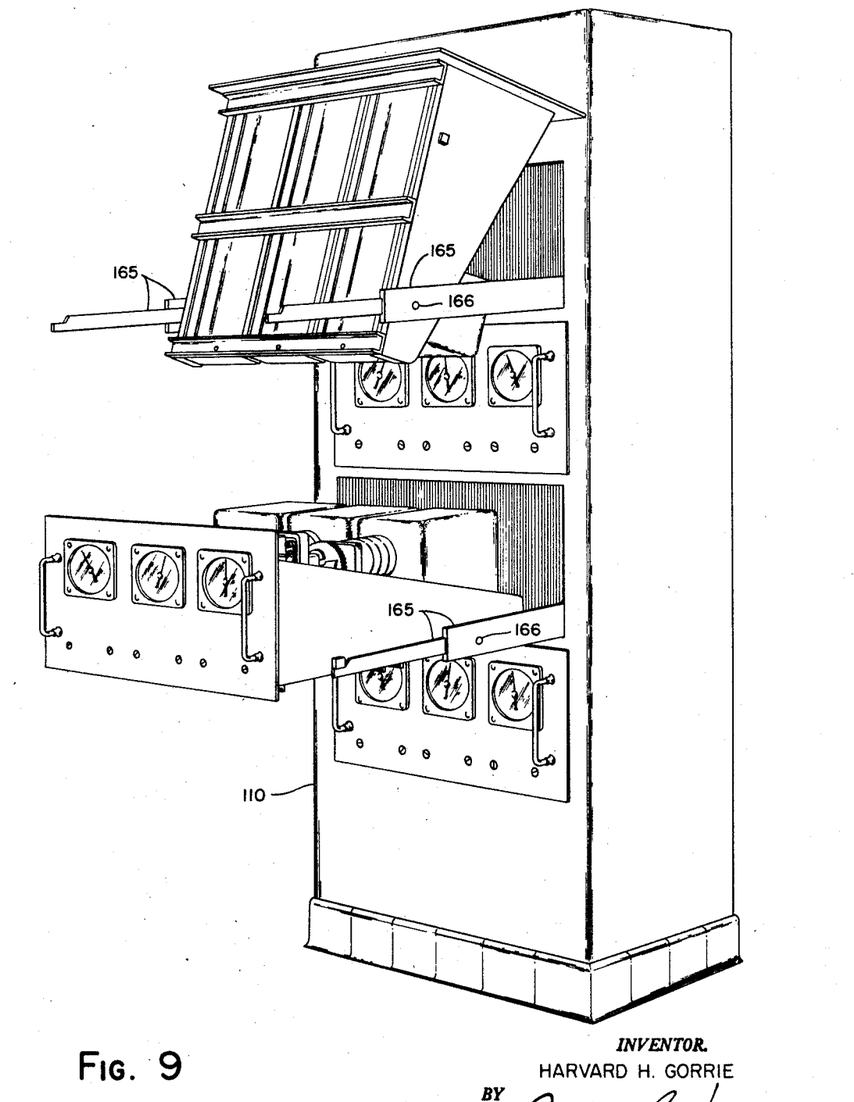
Fig. 9 is a perspective showing of the overall arrangement of the function generator unit, drawer support for the generator, and panel supporting structure.

Fig. 9 is added to give a perspective of the overall arrangement of function generator unit, drawer-support for the generator, and panel-support for the drawer. The drawer of Fig. 6 may be fairly represented by any of the four disclosed in Fig. 9. The generator of Fig. 5 may be represented by any one of the three carried in any of the four drawers.

Track assembly 165 represents the means on which the drawers are withdrawn from panel 110. The upper drawer is illustrated in being pivoted at point 166 in order that the wiring within the chassis of the generator may be readily accessible for maintenance or other purposes.

The disclosure of the invention included the function generator in very elemental systems wherein variables were transduced, or converted, in variation. Further both an electric form and a fluid pressure form of generator was disclosed. A more complex system, including the generator was then disclosed to demonstrate its ability to perform mathematical manipulation of variables. Disclosure was then made of the details of construction of the components of the electrical form of the function generator. These details included a support structure for one or more generator units. The support structure included a drawer support which slides in and out of a panel housing.

Thus, the utility of the generator has been carefully demonstrated in systems and the unique arrangement of its components carefully disclosed. The invention embodied in this structure is defined by the following claims.

What I claim as new and desire to secure by Letters Patent of the United States, is:

1. A deviation indicator including, a transducer for a dependent variable of a process which establishes an analog force proportional to the dependent variable,
a member adapted for rotation,
mechanism adapted to rotate the rotatable member in response to the analog force of the dependent variable,
structure carried by the rotatable member for transmitting and characterizing the rotation of the rotatable member into a motion having a predetermined functional relationship to the rotation of the rotatable member as the desired variation of an independent variable,
a signal-producing mechanism positioned by the transmitting structure carried by the rotatable member in producing a signal representative of the desired variation of the independent variable with variation of the dependent variable,
a transmitting device responsive to the interdependent variable and establishing a force and signal proportional to the actual independent variable as so measured,
and a comparing circuit responsive to the signal-producing device and the transmitting device signal in manifesting the difference between their outputs as the deviation between the actual value of the independent variable and the desired value of the independent variable.

2. The indicator of claim 1 in which, the transducer establishes an electrical signal as the analog force for the dependent variable,
the signal-producing mechanism positioned by the transmitting structure produces an electrical signal,
the transmitting device responsive to the independent variable establishes an electrical signal,
and the comparing circuit includes a balanceable electric network which manifests at balance the deviation between the signal-producing device as representative of the desired value for the independent variable and the transmitter output as representative of the measured value of the independent variable.

3. The indicator of claim 2 in which, the mechanism responsive to the electrical analog for the dependent variable includes a balanceable electric network and a servo motor rotating a shaft as the rotatable member and the network is balanced by the output of an electric element mounted on the shaft,
the structure mounted on the shaft includes a cam whose surface provides the characterization between the rotation of the shaft and the motion applied to positioning the electrical signal-producing device,
and the comparing balanceable network responsive to the electrical signal-producing device and the transmitter responsive to the independent variable includes a motor whose position manifests the difference between the inputs to the comparing structure.

4. The indicator of claim 1 in which, the transducer for the dependent variable is a fluid pressure transmitter which establishes a fluid pressure as the analog force proportional to the dependent variable.

5. The indicator of claim 4 in which the signal-producing device positioned by the transmitter structure is a fluid pressure relay, the transmitter responsive to the independent variable establishes a fluid pressure force as representative of the actual independent variable,
and the comparing structure responsive to the signal-producing device and the transmitter is a fluid pressure relay whose output manifests the difference between the inputs to which it is responsive.

6. The indicator of claim 5 in which, the structure mounted on the rotatable member for transmitting its motion into one proportional to the desired value for the independent variable includes a characterizing cam actuating the signal-producing fluid pressure relay.

7. A device for manifesting deviation of a variable from a standard including, first measuring device responsive to a variable to establish a first electrical value proportional to the variable,
second measuring device responsive to demand for the variable to establish a second electrical value proportional to the demand,
first balanceable electric network responsive to the second electrical value, electric motive means energized by the unbalance of the first balanceable electric network, a shaft member rotated by the electric motive means, an adjustable device positioned by the shaft to establish a third electrical value in the first balanceable electric network to balance the second electrical value, a characterizing cam positioned by the shaft, a device positioned by the cam to produce a fourth electrical value representative of a standard for the variable as a function of demand for the variable, and a second balanceable electric network comparing the first electrical value and the fourth electrical value to manifest their difference.

8. A device for manifesting deviation of variable from a standard including, first measuring device responsive to a variable to establish a first fluid pressure proportional to the variable, second measuring device responsive to demand for the variable to establish a second fluid pressure proportional to the demand, first balanceable fluid pressure system responsive to the second fluid pressure, a shaft member rotated by the first balanceable fluid pressure system, a characterizing cam positioned by the shaft, a device positioned by the cam to produce a third fluid pressure representative of a standard for the variable as a function of demand for the variable, and a second balanceable fluid pressure system comparing the first fluid pressure and the third fluid pressure to manifest their difference.

9. Deviation control structure including, first meter for measuring a first independent variable of a process, second meter measuring a second independent variable of the process, first comparing structure for the outputs of the first and second meters to establish an output continuously representative of a theoretically desired quantitative relation between the independent variables, a function generator responsive to an independent variable upon which the output of the first comparing structure depends and which establishes an output representative of a predetermined variation of the independent variable, second comparing structure for the output of the first comparing structure and the function generator to establish an output representative of a predetermined variation of the quantitative relation between the independent variables, and control means for the independent variable responsive to the output of the second comparing structure.

10. The control of claim 9 wherein the process is the generation of steam by the burning of fuel and air, and wherein, the first meter measures the flow of steam generated, the second meter measures the air of combustion, the first comparing structure includes mechanical linkage positioned by the first and second meters and which positions a fluid pressure transmitter to establish the output representative of the theoretically desired quantitative relation between the variables, a function generator responds to a fluid pressure transmitter actuated by the first meter to position a cam characterized to actuate a fluid pressure transmitter of the generator to establish the output of the generator, the second comparison structure is a fluid pressure ratio relay with provisions for introducing proportional and rate and reset characteristics to its output, and the control means is applied to the air flow in the process in order to vary the steam flow-air flow relation in the predetermined variation from its theoretically desired value.

11. A calculating electrical system including, a first transducer responsive to a dependent variable of the condition and establishing a first electrical signal representative of the dependent variable, a second transducer responsive to a first independent variable of the condition and establishing a force representative of the first independent variable, a shaft member positioned through a finite range of rotation, positioning means for the shaft responsive to the force of the second transducer, and a device producing an electrical signal mounted on the shaft and responding to shaft motion to produce an electrical signal representative of the mathematical combination of the force positioning the shaft and energizing source for the device, and means for energizing the device with the first electrical signal as the source.

12. The calculating electrical system of claim 11 including, a third transducer responsive to a second independent variable of the condition and establishing a force representative of the second independent variable, a shaft and positioning means and electric producing device responsive to the force of the third transducer, and means for energizing the device with the output of the device mounted on the shaft responsive to the force of the second transducer.

13. The calculating system of claim 12 including, a combination of a shaft and positioning means responsive to an electric producing device of the third transducer, a cam mounted on the shaft, a source of signal actuated by the cam to produce a signal representative of a mathematical combination of the independent and dependent variable characterized by the cam.

14. The calculating system of claim 13 in which the dependent variable is flow differential, the first independent variable is pressure, the second independent variable is temperature, and the cam is characterized to produce a signal representative of flow compensated for pressure and temperature.

15. A function generator, including, a unitary chassis, bracket structure mounted on the chassis, a shaft journaled in the bracket structure and carried horizontally of the chassis, indicating means mounted on the shaft for exhibiting its rotation, a motor mounted on the bracket structure and geared to rotate the shaft, circuit structure mounted on the chassis and responding to an electrical input signal to rotate the motor, a first electric signal source mounted on the shaft and bracket for producing an electrical signal which will balance the electrical input signal, and a second electric signal source mounted on the bracket and actuated by structure on the shaft which predetermines the relation of variation between its output and the electrical input signal, said bracket structure comprising three portions the first of which is bolted directly to the chassis and through which is passed the shaft and on which is mounted the second electric signal source, the second of which is bolted to the first portion and in which is journaled the shaft and on which is mounted the indicating means, and the third of which is bolted to the first portion and in which the shaft is journaled and on which is mounted the motor and first electric signal source.

16. The generator of claim 15 in which,
a support block is mounted on the shaft,
and a cam is mounted on the face of the support block by means of a slot in the cam enabling the shaft to be slipped into a central location of the cam; the cam being the structure so mounted on the shaft whose profile predetermines the relation of variation between the input and the output.

References Cited in the file of this patent

UNITED STATES PATENTS

| | | |
|---|---|---|
| 1,922,194 | Brown et al. | Aug. 15, 1933 |
| 2,252,368 | Germer | Aug. 12, 1941 |
| 2,328,499 | Saathoff | Aug. 31, 1943 |
| 2,718,144 | Hornfeck | Sept. 20, 1955 |
| 2,724,082 | Hornfeck | Nov. 15, 1955 |
| 2,774,019 | Hornfeck | Dec. 11, 1956 |